US009305185B1

(12) United States Patent
Pedersen

(10) Patent No.: US 9,305,185 B1
(45) Date of Patent: Apr. 5, 2016

(54) METHOD AND APPARATUS FOR SECURING PROGRAMMING DATA OF A PROGRAMMABLE DEVICE

(71) Applicant: Altera Corporation, San Jose, CA (US)

(72) Inventor: Bruce B. Pedersen, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 184 days.

(21) Appl. No.: 13/740,791

(22) Filed: Jan. 14, 2013

Related U.S. Application Data

(60) Provisional application No. 61/680,423, filed on Aug. 7, 2012.

(51) Int. Cl.
*G06F 21/76* (2013.01)
*G06F 15/177* (2006.01)

(52) U.S. Cl.
CPC ..................... *G06F 21/76* (2013.01)

(58) Field of Classification Search
CPC .............. H04L 9/3247; H04L 63/0428; H04L 41/0806; H04L 63/12; G06F 15/177; G06F 9/44505; G06F 12/1408
USPC ..................................................... 713/2, 176
See application file for complete search history.

(56) References Cited

U.S. PATENT DOCUMENTS

| 5,768,372 | A | 6/1998 | Sung et al. |
| 5,915,017 | A | 6/1999 | Sung et al. |
| 7,058,856 | B2 * | 6/2006 | Shinmori ............... G11C 29/48 714/30 |
| 7,190,190 | B1 * | 3/2007 | Camarota ............... G11C 7/20 326/37 |
| 7,840,178 | B2 * | 11/2010 | Hellman ............... G11B 27/034 455/3.01 |
| 2002/0166062 | A1 * | 11/2002 | Helbig, Sr. ............ G06F 21/554 726/22 |
| 2009/0113198 | A1 * | 4/2009 | Liu et al. ............. H04L 41/0803 713/2 |

* cited by examiner

Primary Examiner — Saleh Najjar
Assistant Examiner — Shiuh-Huei Ku
(74) Attorney, Agent, or Firm — Fletcher Yoder, P.C.

(57) ABSTRACT

Circuitry and methods prevent unauthorized programming, or reprogramming, of a programmable device, by requiring a signature in the configuration data to match a signature previously stored in the programmable device. A programmable integrated circuit device includes an input for configuration data, and programming control circuitry operable to derive a current signature from the configuration data, examine a first bit stored in the programmable integrated circuit device, and when the first bit is in a first state, compare the current signature to a first predetermined signature stored in the programmable integrated circuit device and configure the programmable integrated circuit device according to the configuration data only when the current signature matches the first predetermined signature, and when the first bit is in a second state, configure the programmable integrated circuit device according to the configuration data without comparing the current signature to the first predetermined signature.

26 Claims, 4 Drawing Sheets

METHOD AND APPARATUS FOR SECURING PROGRAMMING DATA OF A PROGRAMMABLE DEVICE

CROSS REFERENCE TO RELATED APPLICATION

This claims the benefit of, commonly-assigned U.S. Provisional Patent Application No. 61/680,423, filed Aug. 7, 2012, which is hereby incorporated by reference herein in its entirety.

STATEMENT REGARDING FEDERALLY SPONSORED RESEARCH OR DEVELOPMENT

This invention was made under Navy Engineering Logistics Office Contract No. N41756-11-C-4004.

FIELD OF THE INVENTION

This invention relates to a method and an apparatus for securing a programmable device—e.g., a field-programmable gate array (FPGA) or other programmable logic device (PLD)—against being programmed by unauthorized programming data.

BACKGROUND OF THE INVENTION

Programmable devices are well known. In one class of known PLDs, each device has a large number of logic gates, and a user programs the device to assume a particular configuration of those logic gates, frequently using a software tool provided by the manufacturer of the device, with the software tool being executed on a computer having an adapter into which the device is inserted. Early generations of such devices typically used some form of programmable read-only memory ("PROM") technology to store the configuration data produced by the software tool. In those early devices, the software tool caused the computer to "burn" the pattern into the PROM storage by fusing fusible links. In later generations, the PROM technology may have been erasable programmable read-only memory ("EPROM") technology, which was not burned, and could be erased (for reprogramming) by exposure to ultraviolet light. Still later generations may have used electrically erasable programmable read-only memory ("EEPROM" or "E$^2$PROM") technology.

All of those technologies were relatively secure. In order to reprogram a device based on one of those technologies, an unauthorized person would have to gain physical access to the device. It was difficult for someone to substitute different programming—e.g., to alter the functioning of the device without authorization. In the non-erasable devices, it was not possible at all. Even in the erasable devices, substantial effort would have been required.

Later, programmable logic devices that store their configuration data in static random access memory ("SRAM") storage became available and remain prevalent. Such devices have the advantage of being smaller and faster than the devices based on EPROM technology.

However, SRAM storage is volatile; it does not retain its contents when power is lost. Therefore, programmable logic devices based on SRAM technology are used with nonvolatile storage, to retain the configuration programming data during times that the device is switched off or otherwise not provided with power. Such nonvolatile storage may be provided, for example, in the form of Flash memory, although any form of nonvolatile storage may be used, and it may be either on, or separate from, the device.

Whatever type of nonvolatile storage is used, someone intent on changing the operation of an SRAM-based programmable logic device without authorization could replace or reprogram the nonvolatile storage containing the configuration data, and the device would load the unauthorized configuration on its next power-up event. Moreover, such devices frequently are reconfigurable or partially reconfigurable during normal operation, so it may be possible for someone without authorization to replace the configuration data in the nonvolatile storage and cause a reconfiguration even without a power-up event.

Commonly-assigned U.S. Pat. Nos. 5,768,372 and 5,915,017, each of which is hereby incorporated by reference herein in its respective entirety, describe the encryption of the configuration data stored in the nonvolatile storage and its decryption upon loading into the programmable device, including provision of an indicator to signal to the decryption circuit which of several possible encryption/decryption schemes was used to encrypt the configuration data and therefore should be used to decrypt the configuration data.

In more recent devices, configuration data may be authenticated by adding an authentication tag to the configuration data, where the authentication tag is based on an authentication key that is programmed into the FPGA. For example, the authentication tag could be generated with a NIST HMAC algorithm based on a NIST SHA2 hash function. The device would then use its programmed authentication key and the same algorithm to verify the authentication tag in the configuration data. One problem with this approach is that a sophisticated attacker may be able to extract the HMAC authentication key from the device (e.g., by using a sophisticated probe such as a focused ion beam probe), allowing the attacker to include a valid authentication key in an unauthorized configuration.

SUMMARY OF THE INVENTION

The present invention relates to circuitry and methods for preventing unauthorized programming, or reprogramming, of a programmable device, by requiring a signature in the programming data to match a signature previously stored in the programmable device. The signature can be stored in a nonvolatile memory in the device.

In addition, additional signatures can be stored in volatile memory. For example, a first configuration can cause the storage of a volatile signature which would then have to be matched by subsequent programming data before reconfiguration will be allowed.

Therefore, in accordance with embodiments of the present invention, there is provided a programmable integrated circuit device including an input for configuration data for the programmable integrated circuit device, and programming control circuitry operable to derive a current signature from the configuration data, examine a first bit stored in the programmable integrated circuit device, and when the first bit is in a first state, compare the current signature to a first predetermined signature stored in the programmable integrated circuit device and configure the programmable integrated circuit device according to the configuration data only when the current signature matches the first predetermined signature, and when the first bit is in a second state, configure the programmable integrated circuit device according to the configuration data without comparing the current signature to the first predetermined signature.

A corresponding method also is provided.

In accordance with additional embodiments of the present invention, a method of configuring a programmable integrated circuit device using input configuration data includes determining whether the input configuration data is an initial set of configuration data or an additional set of configuration data, determining whether a secure option is in effect, when a secure option is in effect, and the input configuration data is an initial set of configuration data, decrypting the input configuration data using a nonvolatile decryption key stored in the programmable integrated circuit device, and configuring the programmable integrated circuit device based on the decrypted input configuration data, and when a secure option is in effect, and the input configuration data is an additional set of configuration data, decrypting the input configuration data using a volatile decryption key stored in the programmable integrated circuit device, and configuring the programmable integrated circuit device based on the decrypted input configuration data, and when a secure option is not in effect, configuring the programmable integrated circuit device based on the input configuration data without decryption.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
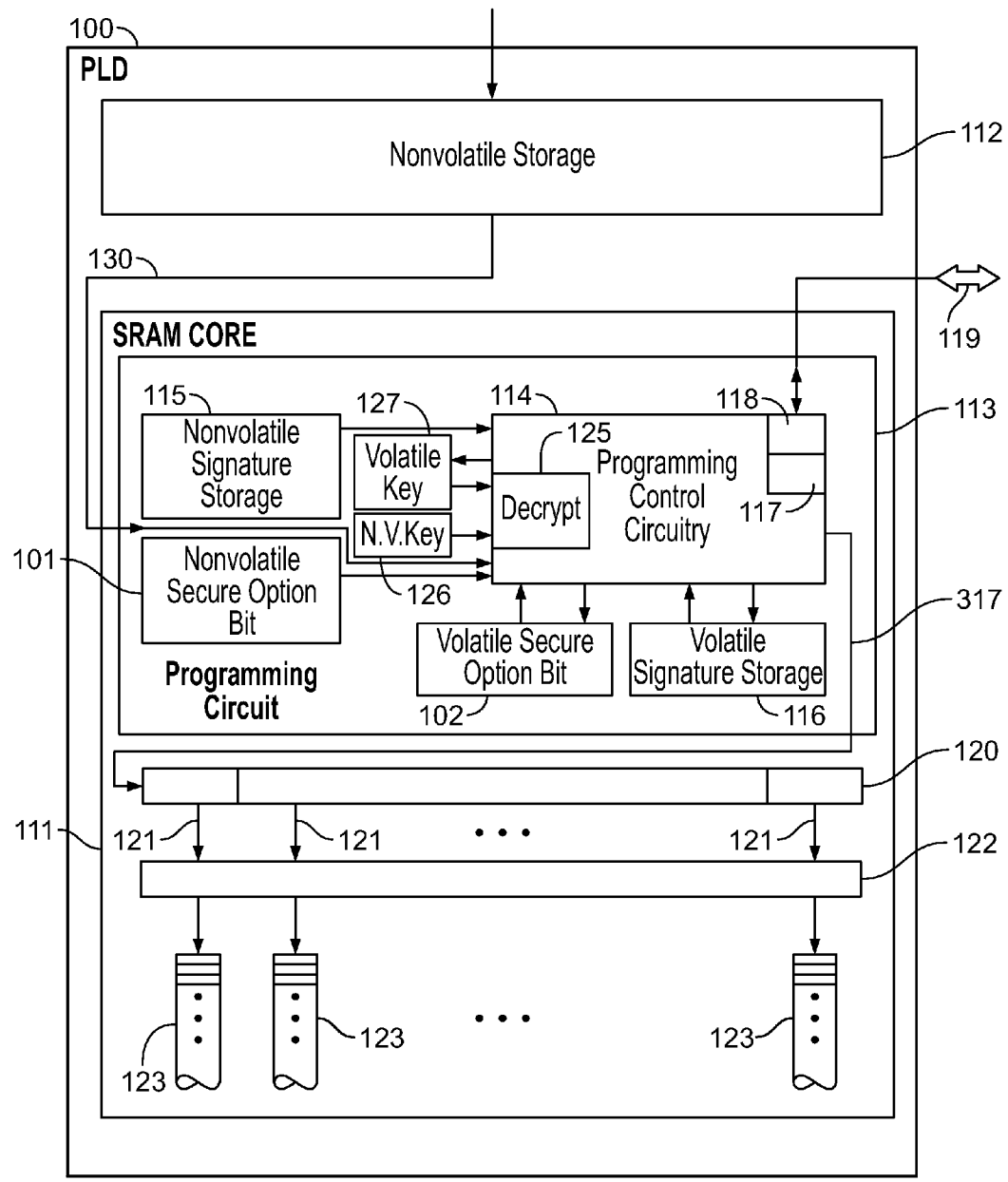
FIG. 1 is a block diagram of a programmable device in which the present invention may be implemented.

FIG. 1 shows a block diagram of a programmable logic device 100 as an example of a programmable device in which the present invention may be implemented. Programmable logic device 100 preferably includes nonvolatile storage 112 which stores the programming data, and an SRAM-based programmable logic core 111, having a programming circuit 113. SRAM-based programmable logic core 111 could be an FPGA, where nonvolatile storage 112 is on a separate die, which may be in a common package with core 111 or completely separate (and connected only by wires or traces). Alternatively, device 100 could be a type of PLD in which nonvolatile storage 112 and core 111 are on the same die.

If the device did not include a signature that the configuration data were required to match, then a different nonvolatile storage 112 containing unauthorized configuration data could be substituted for the original nonvolatile storage 112 containing the authorized configuration data, and on the next power-up or other reconfiguration event of programmable logic device 100, the unauthorized configuration data stored in nonvolatile storage 112 would be loaded to configure device 100.

Therefore, in accordance with a first aspect, programmable logic device 100 may include a nonvolatile signature storage 115. Preferably, nonvolatile signature storage 115 also is only one-time programmable, so that once a signature has been stored in nonvolatile signature storage 115, it cannot be changed or replaced. For example, nonvolatile signature storage 115 may be fuse-based. However, nonvolatile signature storage 115 also may be reprogrammable in some implementations.

In addition to nonvolatile signature storage 115, according to this aspect, programmable device 100 also would include a nonvolatile secure boot option bit 101 which could be set to either a secure boot setting or a non-secure boot setting at the time that device 100 is initially programmed. Nonvolatile secure boot option bit 101 is also referred to as a "nonvolatile secure option bit" or "nonvolatile secure-bit." Again, the secure boot option bit could be a fuse bit, but any nonvolatile unalterable storage technology may be used for nonvolatile secure boot option bit 101. The initial programming could be carried out by the device manufacturer at the request of the user, particularly where fuse-based bits need to be set, or the user could be provided with a programming device to set the fuse-based bits.

In some embodiments, programming control circuitry 114 of programmable device 100 is programmed to, on power-up of programmable device 100, check the status of nonvolatile secure boot option bit 101 and to proceed accordingly. Specifically, if the nonvolatile secure boot option bit 101 is set, programming circuitry 114 will derive a signature from the programming bitstream and compare that derived signature to a signature stored in nonvolatile signature storage 115, configuring device 100 according to the bitstream only if the derived signature matched the stored signature.

For example, the signature may be a hash value derived using a predetermined hashing function or other algorithm, such as, e.g., the aforementioned NIST HMAC algorithm. The authorized user can derive the signature from the initial authorized programming bitstream using the same function or algorithm and program that signature into nonvolatile signature storage 115. In this way, only a single predetermined bitstream can be a valid initial programming bitstream on power-up. Even if an attacker were to somehow extract the stored signature from nonvolatile signature storage 115, it would be nearly impossible for the attacker to create an unauthorized bitstream that would yield the same signature as the stored signature of the authorized bitstream.

An authenticated bitstream would be output over connection 130 to programmable logic core 111. The data preferably would be clocked serially into shift register chain 120. Preferably, when shift register chain 120 is filled, the data in shift register chain 120 would be transferred over connections 121 to buffer 122, whence they are transferred to "columns" 123 of SRAM programming registers which configure the logic structure of programmable logic core 111.

In some embodiments, programming control circuitry 114 of programmable device 100 is programmed to, on power-up of programmable device 100, initialize a volatile secure option bit 102 (also referred to as a "volatile secure-bit") to be the same value as nonvolatile secure boot option bit 101 and load the contents of a volatile signature storage 116 (also referred to as a "volatile-signature register") with the contents of nonvolatile signature storage 115. A signature derived from a programming bitstream is then compared to the signature stored in volatile signature storage 116 if volatile secure option bit 102 is set. Thus, if nonvolatile secure boot option bit 101 is set, volatile secure option bit 102 will initially be set, and programming circuitry 114 will derive a signature from the initial programming bitstream and compare that derived signature to the signature stored in volatile signature storage 116, which initially has the same value as that stored in nonvolatile signature storage 115. Programming circuitry 114 will configure device 100 according to the initial programming bitstream only if the derived signature matched the stored signature in volatile signature storage 116. If no follow-on bitstreams are to be allowed, the initial bitstream will not change the contents of volatile signature storage 116. Specifically, the contents of volatile signature storage 116 will always be the same as the contents of nonvolatile signature storage 116. If volatile secure option bit 102 is set after the initial bitstream is loaded, no follow-on bitstreams will be loaded because no follow-on bitstream will have a signature that matches the contents of nonvolatile signature storage 116.

Device 100 may be capable of reconfiguration "on-the-fly"—i.e., without powering down and back up. If so, then the initial programming bitstream also may set volatile secure option bit 102, and load a further signature into volatile signature storage 116. A follow-on programming bitstream may also set volatile secure option bit 102 and load a signature into volatile signature storage 116 to be used for authenticating subsequent follow-on bitstreams. If volatile secure option bit 102 is set, the signature of any follow-on bitstream for reconfiguration of device 100 would have to match the signature stored in volatile signature storage 116. This allows each bitstream, starting with the initial bitstream, to establish a "chain of trust" from one bitstream to the next.

In some situations, it may be contemplated in the initial bitstream, or in one of the follow-on bitstreams, that the user will want to load a further bitstream, but the further bitstream might not be predetermined at the time the bitstream that is currently loading is created. In that case, in order for any particular current bitstream to be able to load volatile signature storage 116 with the signature of the next bitstream, programmable device 100 may include a module 117 for executing software to use an interface 118 to fetch the signature of the next bitstream from an external source. Such use of module 117 would be invoked by instructions in the current bitstream. Interface 118 could connect via a wired or wireless connection 119 either directly to the source (e.g., on the same circuit board or elsewhere) of the signature of the next bitstream or to a network (e.g., the Internet or a different public or private network). Alternatively, rather than fetching the signature of the next bitstream, module 117 could fetch the next bitstream itself, retaining the next bitstream just long enough to derive its signature. Either way, any such communication could be secured using, e.g., a public-key/private-key scheme.

Thus, to reiterate, there are three possible signatures that could be involved in comparisons to authenticate a bitstream. One is the derived signature of the bitstream being loaded. The derived signature may be compared to one of two other signatures—viz., a signature stored in nonvolatile signature storage 115 or a signature stored in volatile signature storage 116. If the bitstream being loaded is the initial bitstream after power-up (e.g., after power-on-reset), the derived signature will be compared to the signature in nonvolatile signature storage 115 (which in some embodiments may be initially loaded into volatile signature storage 116). If the bitstream being loaded is a follow-on bitstream, the derived signature will be compared to the signature in volatile signature storage 116. Moreover, if the bitstream being loaded is a follow-on bitstream, and it will always be the same follow-on bitstream, volatile signature storage 116 can be loaded by the initial bitstream. But if the follow-on bitstream will not always be the same follow-on bitstream, then a signature will have to be obtained from an outside source as described above, for loading into volatile signature storage 116.

Both the signature in nonvolatile signature storage 115 (also referred to as the "fuse tag", particularly if nonvolatile signature storage 115 is fuse-based), and the signature in volatile signature storage 116 (also referred to as the "volatile tag") may be 256-bit binary numbers. Which of the two tags or signatures is compared to the bitstream tag may be controlled by any of several control bits, as follows.

First, the bitstream itself may contain a security bit. If the bitstream's secure-boot option bit (also referred to as the bitstream's secure-boot bit) is set ("set" can mean having value of '1' or '0', depending on the user implementation), then regardless of any other security bit (see below), the signature of the bitstream is compared to the signature stored in nonvolatile signature storage 113 (i.e., to the fuse tag). This is logical, insofar as an attacker would not include in an unauthorized bitstream a command to examine a signature that the attacker could not match. Similarly, even an authorized bitstream would not have this bit set if it were a follow-on bitstream, because its signature could not be made to match the signature stored in nonvolatile signature storage 115.

Next, to continue to reiterate, device 100 includes nonvolatile secure boot option bit 101 (also known as the secure fuse bit, particularly if it is stored in a fuse-based memory). If this bit is set (see above), then again regardless of any other security bit (see below), the signature of the initial bitstream is compared to the signature stored in nonvolatile signature storage 115 (i.e., to the fuse tag). Of course, if the bitstream security bit, which is examined first, is set, it will already have determined that the signature stored in nonvolatile signature storage 115 is the signature to be examined, but that is not inconsistent with examining the signature stored in nonvolatile signature storage 115 for comparison with the signature of an initial bitstream whenever nonvolatile secure boot option bit 101 is set. In some embodiments, a bitstream may have an option bit that specifies whether the bitstream is an initial bitstream, and if such an option bit identifies the bitstream as an initial bitstream, then the signature of the initial bitstream is compared to the signature stored in nonvolatile signature storage 115 regardless of any other security bit (see below).

Next, to continue to reiterate, device 100 includes volatile secure option bit 102 (otherwise known as the volatile secure-bit). In some embodiments, this bit is initialized at power-on to have the same value as nonvolatile secure boot option bit 101, and can be changed by a bitstream (initial or follow-on) to control whether the signature of the next bitstream should be compared to the signature stored in volatile signature storage 116. Specifically, if the volatile secure option bit 102 is set (see above) by a bitstream, then the signature of the next follow-on bitstream is compared to the signature stored in volatile signature storage 116. Again this is logical, because the signature of a follow-on bitstream could not be made to match the nonvolatile signature. If volatile secure option bit 102 is not set, and neither the bitstream's secure-boot option bit nor the nonvolatile secure boot option bit is set, then the signature is not checked, except as discussed below.

In some embodiments, programmable device 100 has a register for storing a volatile non-secure bit that defaults to off, but can be set by configuration data in a bitstream (and the state of the non-secure bit can be subsequently changed again by subsequent bitstreams). If the non-secure bit is set (see above), the signature of any incoming bitstream is not checked against any predetermined signature (e.g., a signature stored in nonvolatile signature storage 115 or volatile signature storage 116) regardless of the values of nonvolatile secure boot option bit 101 and volatile secure option bit 102. When the non-secure bit is set, programmable device 100 may be referred to as being in a "non-secured" state.

It will be apparent from the foregoing, that any bitstream, though itself secure, may turn off security for the subsequent bitstream. Similarly, an unsecured bitstream may turn on security for a subsequent bitstream, although this is likely to be uncommon.

There may be other security bits. For example, in some implementations, each bitstream could contain a bit whose value specifies whether the bitstream is an initial bitstream or a follow-on bitstream. If this bit specifies a follow-on bitstream but the bitstream is the first bitstream after power-up, then something is wrong and the bitstream should not be loaded. Conversely, if the bit specifies an initial bitstream, but the bitstream is not the first bitstream after power-up, then again something is wrong and the bitstream should not be loaded. And if the bit specifies an initial bitstream, and the bitstream is the first bitstream after power-up, then in some implementations the signature of this bitstream may be compared to the signature stored in nonvolatile signature storage 115 regardless of the values of the other secure boot option bits discussed above. Similarly, if the bit specifies a follow-on bitstream, and the bitstream is indeed a follow-on bitstream, then in some implementations the signature of this bitstream may be compared to the signature stored in volatile signature storage 116 regardless of the values of the other secure boot option bits discussed above.

Initial and follow-on bitstreams may optionally be encrypted. Programmable device 100 may include a decryption module 125, a nonvolatile decryption key storage 126 and a volatile decryption key storage 127. In implementations where these are present, and are used, then preferably a bitstream that has been authenticated, in the manner described above, using a signature stored in volatile signature storage 116, can be decrypted only using the decryption key stored in volatile decryption key storage 127, while a bitstream that has been authenticated using a signature stored in nonvolatile signature storage 115 can be decrypted only using the decryption key stored in nonvolatile decryption key storage 126.

Figure 2:
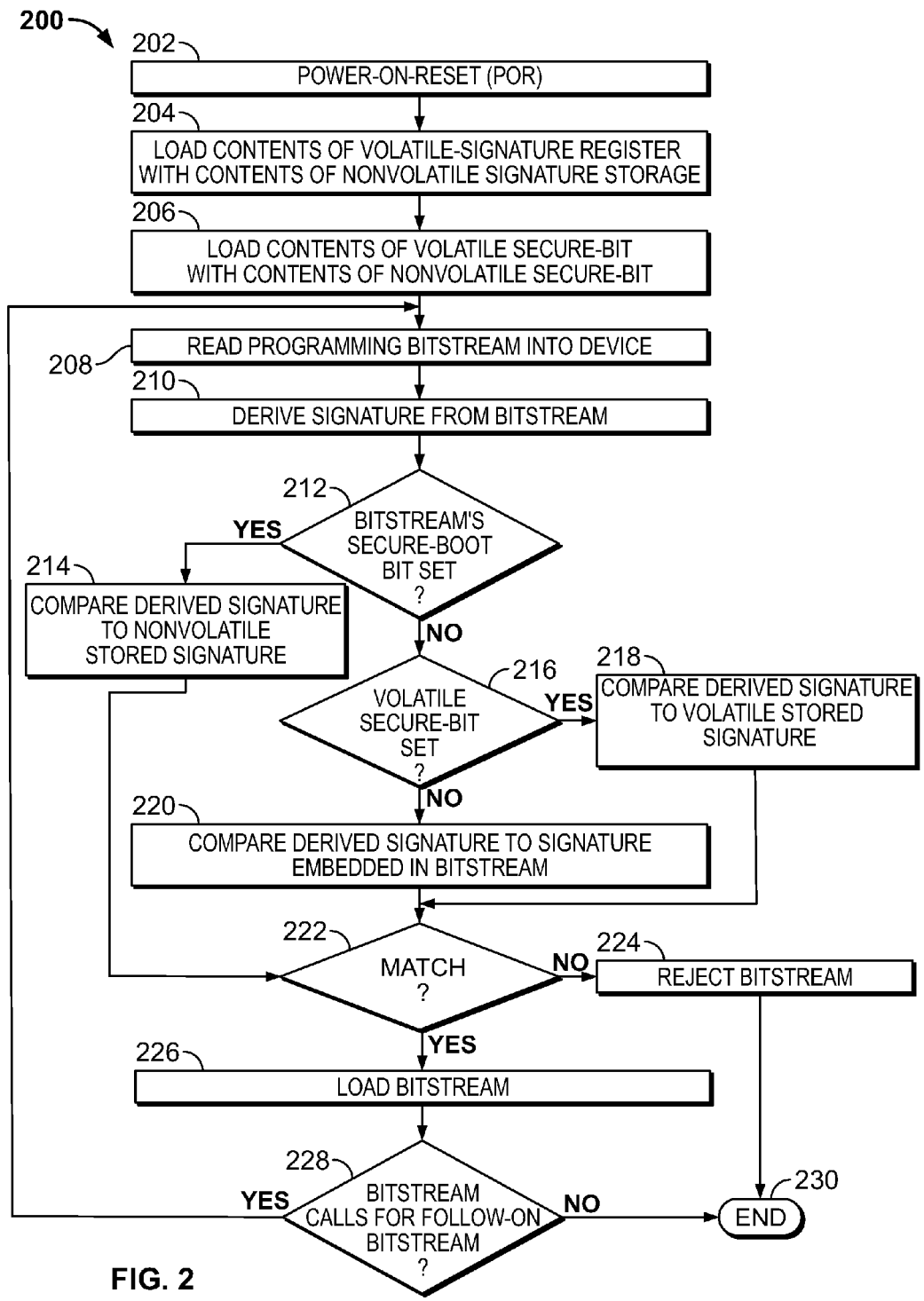
FIG. 2 is a flow diagram of a bitstream loading method according to an implementation of the present invention.

FIG. 2 diagrams one implementation of a method 200 according to the present invention for authenticating an original or follow-on bitstream. The elements of method 200 may be carried out by programming control circuitry 114. Method 200 as diagrammed in FIG. 2 does not perform the aforementioned comparisons to determine whether any indicators within the bitstream as to whether the bitstream is an initial or follow-on bitstream agree with a flag stored by programming control circuitry 114 to indicate whether the bitstream is an initial or follow-on bitstream, although such a method is clearly within the scope of the present invention as described above.

Method 200 starts at 202 with a power-on-reset (POR) of device 100, whereupon at 204, contents of a volatile signature register (e.g., volatile signature storage 116) are loaded with contents of a nonvolatile signature storage (e.g., nonvolatile signature storage 115), and at 206, contents of a volatile secure-bit (e.g., volatile secure option bit 102) are loaded with the contents of a nonvolatile secure-bit (e.g., nonvolatile secure boot option bit 101).

Next, at 208, a programming bitstream is read into device 100. The programming bitstream may be an initial bitstream or a follow-on bitstream, although the first instance of 208 after a power-on reset 202 will necessarily be an initial bitstream. Preferably, programming control circuitry 114 maintains a flag, as noted above, to indicate whether the bitstream is an initial or follow-on bitstream.

At 210, programming control circuitry 114 derives a signature from the bitstream, using, e.g., the hash function described above, or any other suitable function. Next, at test 212, programming control circuitry 114 determines whether a secure-boot bit is set within the bitstream itself (regardless of whether the bitstream is an initial bitstream or not). If so, then at 214, programming control circuitry 114 compares the signature derived at 210 to a nonvolatile stored signature (e.g., in nonvolatile signature storage 115). If not, then at test 216, programming control circuitry 114 determines whether a volatile secure-bit (e.g., volatile secure option bit 102) is set. If, at test 216, the volatile secure-bit is set, then at 218, programming control circuitry 114 compares the signature derived at 210 to a volatile stored signature (e.g., in volatile signature storage 116). If, at test 216, the volatile secure-bit is not set, then at 220, programming control circuitry 114 compares the signature derived at 210 to a signature embedded in the read-in bitstream.

If the result 222 of any of comparisons 214, 218, and 220 is not a match, the read-in bitstream is rejected at 224 and method 200 ends at 230. If the result 222 of any of comparisons 214, 218, and 220 is a match, then the bitstream is loaded at 226.

After the bitstream has been loaded at 226, device 100 operates in accordance with the bitstream programming. In some cases, one instruction in that programming could be to call for the loading of a follow-on bitstream. If so, another instruction might also be to set or clear volatile secure-bit 102. If programming control circuitry 114 does not, at test 228, detect an instruction to load a follow-on bitstream, then method 200 ends at 230. However, if at test 228 programming control circuitry 114 does detect an instruction to load a follow-on bitstream, then method 200 returns to 208 and continues as described above.

Figure 3:
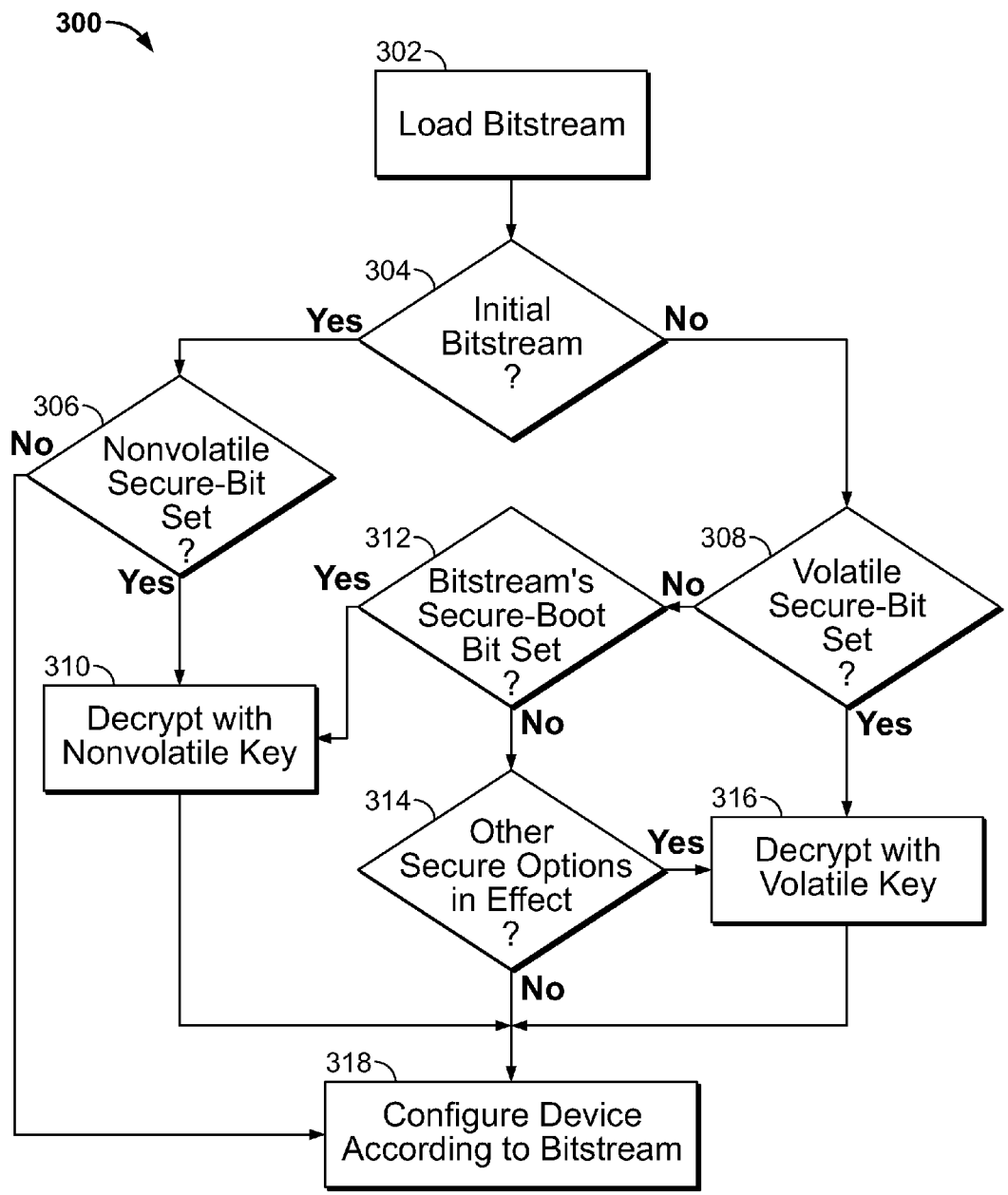
FIG. 3 is a flow diagram of a bitstream decryption method according to an implementation of the present invention.

FIG. 3 diagrams a decryption method 300 according to one implementation of the invention, which may be carried out after a bitstream has been authenticated in a method such as method 200 of FIG. 2 and has been loaded at 226 (although the bitstream may have been authenticated by another method).

Method 300 starts at 302 with the loading of the authenticated bitstream. At test 304, programming control circuitry 114 determines whether the bitstream is an initial bitstream (e.g., based on a flag maintained by programming control circuitry 114, or possibly by a flag within the bitstream which is verified against a flag maintained by programming control circuitry 114, as noted above). If the bitstream is an initial bitstream, then at test 306, programming control circuitry 114 determines whether the nonvolatile secure-bit (e.g., nonvolatile secure boot option bit 101) is set. If not, then in this implementation there is no encryption and the bitstream instructions are run at 318. If the nonvolatile secure-bit is set, then at 310 decryption module 125 decrypts the bitstream using nonvolatile key 126 (e.g., because a nonvolatile signature stored in nonvolatile signature storage 115 was used) and the bitstream instructions are run at 318.

If, at test 304, the bitstream is not an initial bitstream, then at test 308, programming control circuitry 114 determines whether the volatile secure-bit (e.g., volatile secure option bit 102) is set. If so, then at 316 decryption module 125 decrypts the bitstream using volatile key 127 (e.g., because a volatile signature stored in volatile signature storage 116 was used) and the bitstream instructions are run at 318.

If, at test 308, the volatile secure-bit is not set, then at test 312, programming control circuitry 114 determines whether the bitstream's secure-boot bit is set. If so, then method 300 proceeds to 310 and continues as described above. If, at test 312, the bitstream's secure-boot bit is not set, then at test 314, programming control circuitry 114 determines whether other secure options are in effect. If so, then method 300 proceeds to 316 and continues as described above. If, at test 314, no other secure options are in effect, then in this implementation there is no encryption and the bitstream instructions are run at 318. Note that while this embodiment assumes that encryption is not being used if the bitstream did not have to be authenticated using one of the stored signatures, there may be embodiments where encryption is used regardless of whether authentication was used.

Thus it is seen that a method and an apparatus for securing a programmable device against being programmed by unauthorized programming data have been provided.

Figure 4:
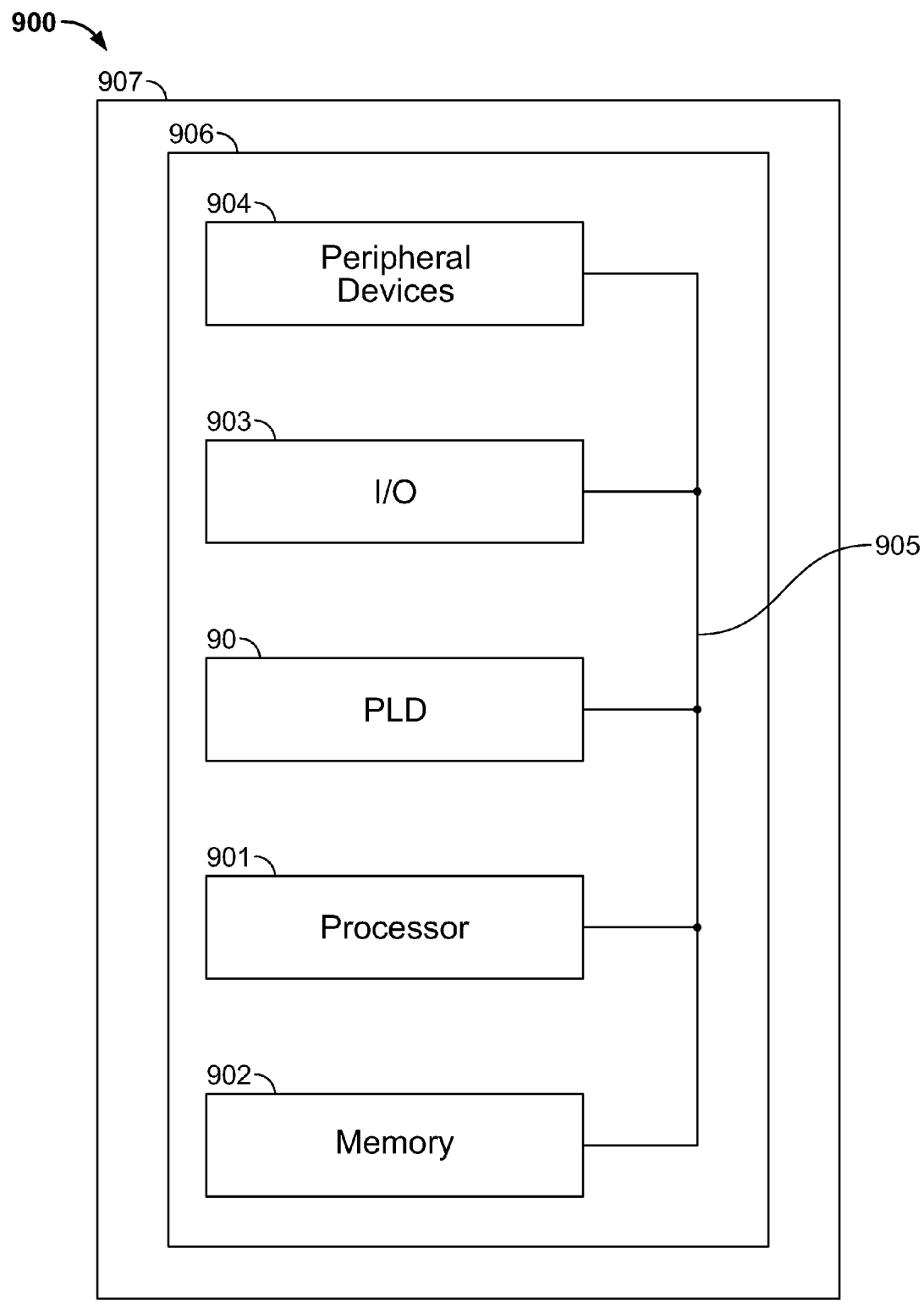
FIG. 4 is a simplified block diagram of an illustrative system employing a programmable logic device incorporating the present invention.

A PLD 90 programmed according to any embodiment of the present invention may be used in many kinds of electronic devices. One possible use is in a data processing system 900 shown in FIG. 4. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A programmable integrated circuit device comprising:
an input for configuration data for said programmable integrated circuit device; and
programming control circuitry operable to:
derive a current signature from said configuration data,
examine a first bit stored in said programmable integrated circuit device after the current signature is derived,
when said first bit is in a first state, compare said current signature to a first predetermined signature stored in said programmable integrated circuit device and configure said programmable integrated circuit device according to said configuration data only when said current signature matches said first predetermined signature, and
when said first bit is in a second state, configure said programmable integrated circuit device according to said configuration data without comparing said current signature to said first predetermined signature.

2. The programmable integrated circuit device of claim 1 further comprising:
nonvolatile security storage for a nonvolatile secure option bit; and
nonvolatile signature storage for a nonvolatile predetermined signature.

3. The programmable integrated circuit device of claim 2 wherein said first bit is said nonvolatile secure option bit and said first predetermined signature is said nonvolatile predetermined signature.

4. The programmable integrated circuit device of claim 2 wherein said nonvolatile security storage is write-once storage.

5. The programmable integrated circuit device of claim 4 wherein said nonvolatile security storage is fuse-based.

6. The programmable integrated circuit device of claim 2 wherein said nonvolatile signature storage is write-once storage.

7. The programmable integrated circuit device of claim 6 wherein said nonvolatile signature storage is fuse-based.

8. The programmable integrated circuit device of claim 2 wherein said programming control circuitry is further operable to:
examine said configuration data for a programmed secure option bit, wherein said first bit is said programmed secure option bit and said first predetermined signature is said nonvolatile predetermined signature;
when said programmed secure option bit is in a first programmed state, compare said current signature to said nonvolatile predetermined signature without regard to said nonvolatile secure option bit, and configure said programmable integrated circuit device according to said configuration data only when said current signature matches said nonvolatile predetermined signature; and
when said programmed secure option bit is in a second programmed state, proceed in accordance with said nonvolatile secure option bit.

9. The programmable integrated circuit device of claim 2 further comprising:
volatile security storage for a volatile secure option bit; and
volatile signature storage for a volatile predetermined signature; wherein:
said programming control circuitry is further operable to:
program said volatile secure option bit into said volatile security storage, and said volatile predetermined signature into said volatile signature storage, based on instructions in one set of configuration data,
reconfigure said programmable integrated circuit device based on an additional set of configuration data applied to said input subsequently to said one set of configuration data,
derive an additional signature from said additional set of configuration data,
examine said volatile secure option bit,
when said volatile secure option bit is in said first state, compare said additional signature to said volatile predetermined signature and configure said programmable integrated circuit device according to said additional set of configuration data only when said additional signature matches said volatile predetermined signature, and
when said volatile secure option bit is in said second state, configure said programmable integrated circuit device according to said additional set of configuration data without comparing said additional signature to said volatile predetermined signature.

10. The programmable integrated circuit device of claim 9 wherein said programming control circuitry is further operable to:

examine each set of configuration data for a programmed secure option bit; and for any particular set of configuration data in which said programmed secure option bit is in a state indicating secure operation, compare a signature derived from said particular set of configuration data to said nonvolatile predetermined signature and configure said programmable integrated circuit device according to said particular set of configuration data only when said signature derived from said particular set of configuration data matches said nonvolatile predetermined signature.

11. The programmable integrated circuit device of claim 9 further comprising:

nonvolatile key storage for a nonvolatile decryption key; and volatile key storage for a volatile decryption key; wherein:

said programming control circuitry comprises a decryption module; and said programming control circuitry is further operable to:

keep track of whether a current set of configuration data is an initial set of configuration data or an additional set of configuration data, when said current set of configuration data is an initial set of configuration data and said nonvolatile secure option bit is in said first state, decrypt said initial set of configuration data with said nonvolatile decryption key, and then configure said programmable integrated circuit device according to said decrypted initial set of configuration data, when said current set of configuration data is an additional set of configuration data and said volatile secure option bit is in said first state, decrypt said additional set of configuration data with said volatile decryption key, and then configure said programmable integrated circuit device according to said additional set of configuration data, and configure said programmable integrated circuit device according to said current set of configuration data without decryption when neither said nonvolatile secure option bit nor said volatile secure option bit is in said first state.

12. The system of claim 1 wherein a state of said first bit is changed based on information in an additional set of configuration data applied to said input.

13. The system of claim 12 wherein said programming control circuitry is further operable to:

when said first bit is in said second state, configure said programmable integrated circuit device according to a subsequent additional set of configuration data without comparing a signature of said subsequent additional set of configuration data to any predetermined signature stored in said device.

14. A method of configuring a programmable integrated circuit device using input configuration data, said method comprising:

deriving a current signature from said configuration data;

examining a first bit stored in said programmable integrated circuit device after the current signature is derived;

when said first bit stored in said device is in a first state, examining a first predetermined signature stored in said device and configuring said programmable integrated circuit device according to said configuration data only when said current signature matches said first predetermined signature; and when said first bit is in a second state, configuring said programmable integrated circuit device according to said configuration data without comparing said current signature to said first predetermined signature.

15. The method of claim 14 wherein said first bit is a nonvolatile secure option bit stored in said device and said first predetermined signature is a nonvolatile predetermined signature stored in said device.

16. The method of claim 14 further comprising:

examining said configuration data for a programmed secure option bit, wherein said first bit is said programmed secure option bit and said first predetermined signature is a nonvolatile predetermined signature stored in said device;

when said programmed secure option bit is in a first programmed state, comparing said current signature to said nonvolatile predetermined signature without regard to a nonvolatile secure option bit stored in said device, and configure said programmable integrated circuit device according to said configuration data only when said current signature matches said nonvolatile predetermined signature; and when said programmed secure option bit is in a second programmed state, proceeding in accordance with said nonvolatile secure option bit.

17. The method of claim 14 further comprising:

determining whether said input configuration data is an initial set of configuration data or an additional set of configuration data;

when said input configuration data is an initial set of configuration data, proceeding based on a nonvolatile secure option bit stored in said device;

when said input configuration data is an additional set of configuration data:

deriving an additional signature from said additional set of configuration data, when a volatile secure option bit stored in said device is in a first state, examining a volatile predetermined signature stored in said device and configuring said programmable integrated circuit device according to said configuration data only when said additional signature matches said volatile predetermined signature, and when said volatile secure option bit stored in said device is in a second state, configuring said programmable integrated circuit device according to said additional set of configuration data without comparing said additional signature to said volatile predetermined signature.

18. The method of claim 17 further comprising:

examining each set of configuration data for a programmed secure option bit; and for any particular set of configuration data in which said programmed secure option bit is in a state indicating secure operation, comparing a signature derived from said particular set of configuration data to a nonvolatile predetermined signature stored in said device and configuring said programmable integrated circuit device according to said particular set of configuration data only when said signature derived from said particular set of configuration data matches said nonvolatile predetermined signature.

19. The method of claim 17 further comprising:

changing said volatile secure option bit based on information in said input configuration data; and processing a subsequent additional set of input configuration data based on said changed volatile secure option bit.

20. The method of claim 17 further comprising:

changing said volatile predetermined signature based on information in said input configuration data; and processing a subsequent additional set of input configuration data based on said changed volatile predetermined signature.

21. The method of claim 17 further comprising:

keeping track of whether a current set of configuration data is an initial set of configuration data or an additional set of configuration data, when said current set of configuration data is an initial set of configuration data and said nonvolatile secure option bit is in said first state, decrypting said initial set of configuration data with a nonvolatile decryption key stored in said programmable integrated circuit device, and then configuring said programmable integrated circuit device according to said decrypted initial set of configuration data, when said current set of configuration data is an additional set of configuration data and said volatile secure option bit is in said first state, decrypting said additional set of configuration data with a volatile decryption key, and then configuring said programmable integrated circuit device according to said additional set of configuration data, and configuring said programmable integrated circuit device according to said current set of configuration data without decryption when neither said nonvolatile secure option bit nor said volatile secure option bit is in said first state.

22. The method of claim 21 further comprising:

changing said volatile decryption key based on information in said input configuration data; and decrypting a subsequent additional set of input configuration data based on said changed volatile decryption key.

23. The method of claim 14 further comprising changing a state of said first bit based on information in an additional set of input configuration data.

24. The method of claim 23 further comprising configuring, when said first bit is in said second state, said programmable integrated circuit device according to a subsequent additional set of configuration data without comparing a signature of said subsequent additional set of configuration data to any predetermined signature stored in said device.

25. A method of configuring a programmable integrated circuit device using input configuration data, said method comprising:

determining whether said input configuration data is an initial set of configuration data for the programmable integrated circuit device or an additional set of configuration data for the same programmable integrated circuit device;

determining whether a secure option is in effect;

when a secure option is in effect, and said input configuration data is an initial set of configuration data, decrypting said input configuration data using a nonvolatile decryption key stored in said programmable integrated circuit device, and configuring said programmable integrated circuit device based on said decrypted input configuration data;

when a secure option is in effect, and said input configuration data is an additional set of configuration data, decrypting said input configuration data using a volatile decryption key stored in said programmable integrated circuit device, and configuring said programmable integrated circuit device based on said decrypted input configuration data; and when a secure option is not in effect, configuring said programmable integrated circuit device based on said input configuration data without decryption.

26. The method of claim 25 further comprising:

changing said volatile decryption key based on information in said input configuration data; and decrypting a subsequent additional set of input configuration data based on said changed volatile decryption key.

* * * * *